United States Patent [19]
Shen et al.

[11] Patent Number: 6,122,444
[45] Date of Patent: Sep. 19, 2000

[54] METHOD AND APPARATUS FOR MANIPULATION OF DIGITAL DATA IN MULTIPLE PARALLEL BUT INCONGRUENT BUFFERS

[75] Inventors: Albert Shen, Portland; Jeffrey Kidder, Hillsboro, both of Oreg.

[73] Assignee: Intel Corporation, Santa Clara, Calif.

[21] Appl. No.: 08/758,232

[22] Filed: Nov. 27, 1996

[51] Int. Cl.$^7$ .................................................. G06F 13/00
[52] U.S. Cl. ......................... 395/872; 395/877; 711/149; 711/167; 711/168
[58] Field of Search ................................... 395/872, 873, 395/876, 877, 821, 874, 875; 704/278, 201; 711/167, 136, 149, 170, 171, 172, 119, 120, 168

[56] References Cited

U.S. PATENT DOCUMENTS

| | | |
|---|---|---|
| 4,169,289 | 9/1979 | Shively . |
| 4,447,873 | 5/1984 | Price et al. . |
| 4,945,548 | 7/1990 | Iannarone et al. . |
| 5,319,583 | 6/1994 | Wildes . |
| 5,680,482 | 10/1997 | Liu et al. . |

*Primary Examiner*—Ayaz R. Sheikh
*Assistant Examiner*—Rupal Dharia
*Attorney, Agent, or Firm*—Jeffrey Draeger

[57] ABSTRACT

A method and apparatus for performing signal processing using incongruent buffers. According to one method described, a maximum concurrent run length (MCRL) is calculated to indicate the maximum run length before any of a plurality of buffers is exhausted. Processing data for each of the plurality of incongruent buffers is then repeated until the maximum concurrent run length has been reached. The calculation of the MCRL may be a determination of which of the plurality of buffers has a lowest remaining time before buffer exhaustion or the least number of remaining buffer entries. A system described includes a processor coupled to memory. The memory contains a plurality of buffer counters and a plurality of memory blocks defining a plurality of incongruent buffers. The memory also contains a MCRL calculation routine for determining the MCRL count from the buffer counters. A data processing routine repeats manipulations of data in the incongruent buffers until the MCRL count is reached.

28 Claims, 5 Drawing Sheets

METHOD AND APPARATUS FOR MANIPULATION OF DIGITAL DATA IN MULTIPLE PARALLEL BUT INCONGRUENT BUFFERS

FIELD OF THE INVENTION

The present invention pertains to the field of digital signal processing. More particularly, the present invention pertains to techniques of performing parallel data manipulations using incongruent data buffers.

BACKGROUND

Many digital signal processing tasks involve computationally intensive data manipulation. Such tasks include the processing of audio, video, electrocardiogram, radar, or other time varying signals. The intensive nature of such processing generally results from both high data throughput and algorithm complexity. Furthermore, most signal processing algorithms require data buffer resources to maintain computed values for feedback into subsequent calculations. Thus, digital signal processing burdens processing and storage resources.

Of course, the overall complexity of a signal processing task dramatically impacts resource requirements. Regardless of complexity, however, a number of common filters are applied to many different types of data. Accordingly, general processing techniques which can be applied to a filter (or even a portion of a filter) may be applied to a mathematically similar filter portion employed in another context (i.e. filtering a different type of data).

Figure 1:
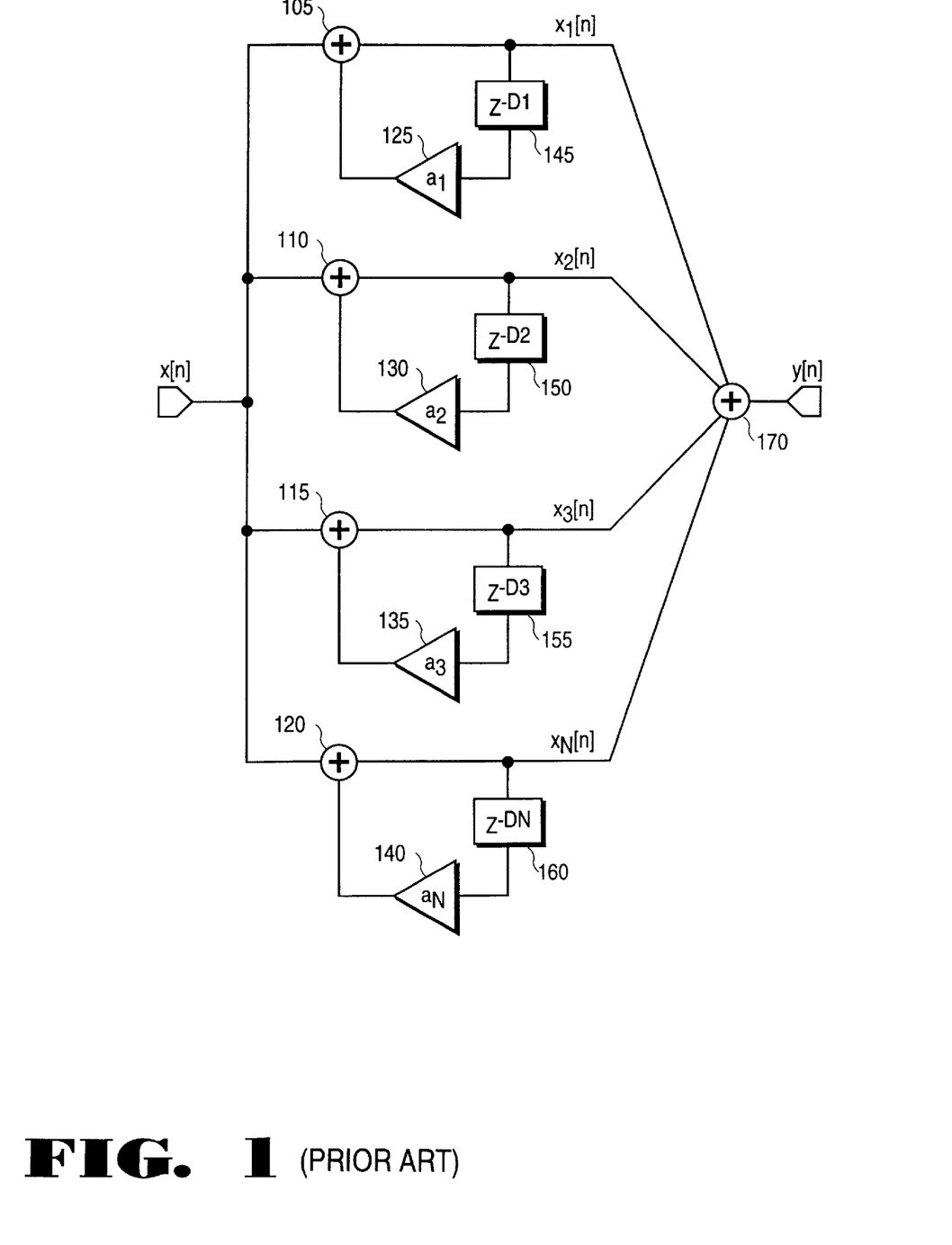
FIG. 1 illustrates a block representation of a portion of one typical digital filter.

One common digital filter structure, illustrated in FIG. 1, includes a sum of parallel terms. In this system, an output signal y[n] is derived from an input signal x[n] through multiple parallel individual filters, each having at least one coefficient and delay value. In more complex systems, each parallel filter could have multiple delay taps and coefficients; however, the simplest case sufficiently illustrates shortcomings of traditional processing techniques.

In the illustrated system, a summation block 170 sums the output of the separate transfer functions $x_1$ through $x_N$. A first transfer function is formed by a summation block 105 which sums an input value of x[n] with a feedback value delayed by a delay (storage) block ($Z_{-D1}$) 145 and scaled by a factor of a1 at a feedback multiplier 125. Similarly, the second, third and Nth terms are respectively formed by summation blocks 110, 115, and 120, delay blocks 150, 155, and 160, and feedback multipliers 130, 135, 140. Additional scaling blocks are often used to multiply the outputs $x_1[n]$–$x_N[n]$ by additional scaling factors $b_1$–$b_N$ before the summation block 170.

One example of a filter which employs such a parallel structure is an audio filter which produces a reverberation (reverb) effect. This filter, known as a Schroeder reverb processor, includes a parallel structure such as that shown in FIG. 1 as well as additional scaling blocks prior to the summation block 170 and series filtering functions subsequent to the summation block 170 (see *Introduction to Signal Processing*, Orfanidis, Sophocles J., p. 372, Prentice Hall, 1996.) In this case, the delay coefficients ($D_1$–$D_N$) may be varied to model an environment of changing sound reflections.

Computations for the parallel branches of such filters are usually more efficiently performed in parallel, meaning that a number of computations are performed for each new data item before advancing to the next data item. In this example, each individual data manipulation (i.e. each parallel filter computation) is performed on some discrete quanta of data for each of the N parallel branches prior to repeating any manipulation for new data. Thus, $x_1[n_1]$–$x_N[n_1]$ are all computed before $x_1[n_2]$, $n_2$ being subsequent to $n_1$.

To compute the value of y[n], N buffers must be used to maintain respectively $D_1$–$D_N$ historical values of $x_1[n]$–$x_N[n]$. For example, since the transfer function $x_1$ includes a delay element $Z_{-D1}$ (block 145), each value of $x_1$ is stored for a computation which utilizes this value $D_1$ data values later (i.e. $x_1[1]$ is used to compute $x_1[D_1]$). In this example, a pointer indicates the location $x_1[1]$ when $x_1[D_1]$ is computed ($x_1[D_1]$=$x[D_1]$+$a_1$* $x_1[1]$). The value of $x_1[D_1]$ is then stored at the location indicated and the pointer is advanced to $x_1[2]$. Typically, buffers storing this data are implemented as circular buffers such that when the pointer reaches the end of the buffer, it is reset to allow continuous processing.

One possibility for implementing such buffers is to use N congruent (of the same length) buffers which are each long enough for the largest delay. It may be desirable to use buffers of the same length if congruent buffers are available in hardware or conveniently reserved in memory. Additionally, while many pointers may be needed to index into incongruent buffers, one pointer may suffice to track the position for a number of congruent buffers. This one pointer only requires service (needs to be reset to the beginning of the buffer) when all of the buffers have reached their endpoints. Unfortunately, the use of congruent buffers wastes buffer space for each delay which is less than a longest delay $D_{MAX}$. That is, $D_{MAX}$ values are stored for each function $x_1$–$x_N$ when, for example, only $D_1$ values are necessary to accurately compute $x_1$. Excessive buffer size is particularly undesirable considering the already significant resource drain involved in digital signal processing.

Multiple incongruent buffers sized appropriately for each delay $D_1$–$D_N$ help eliminate the problem of wasted buffer space occurring when congruent buffers are used. If a buffer of exactly the right length is used for each of the delays $D_1$–$D_N$, no storage more than necessary to compute $x_1$–$x_N$ is consumed. Unfortunately, pointers which are uniformly advanced through incongruent buffers can reach an endpoint and require service at different points in time even though the buffers are being used to process data in parallel. That is, a buffer of length six hundred may reach an endpoint (become "exhausted") and require a pointer to be reset at different time than a buffer of length nine hundred. If proper checks are not performed for each buffer, the shorter buffer may over-run its endpoint and corrupt data. Thus, tracking of each incongruent buffer is necessary to prevent over-run. Such tracking can significantly reduce performance of otherwise tight computation loops performing the desired data manipulation.

Accordingly, prior art approaches to parallel data manipulation may not provide adequate efficiency. The prior art approaches tend to either consume excessive memory or have an inner computation loop performing data manipulations in a manner incurring significant overhead. Thus, a need has arisen for an approach efficiently utilizing available memory and maintaining a simple efficient inner computation loop.

SUMMARY

The present disclosure describes a method and apparatus for performing signal processing using incongruent buffers. According to one method described, a maximum concurrent run length (MCRL) is calculated to indicate the maximum run length before any of a plurality of buffers is exhausted. Processing data for each of the plurality of incongruent buffers is then repeated until the maximum concurrent run length has been reached. The calculation of the MCRL may be a determination of which of the plurality of buffers has the lowest remaining time or the least number of remaining buffer entries.

A system which implements one described data manipulation method includes a processor coupled to a memory. The memory contains a plurality of buffer counters and a plurality of memory blocks defining a plurality of incongruent buffers. The memory also contains a MCRL calculation routine for determining the MCRL count from the buffer counters. A data processing routine repeats manipulations of data in the incongruent buffers until the MCRL count is reached.

BRIEF DESCRIPTION OF THE FIGURES

The present invention is illustrated by way of example and not limitation in the figures of the accompanying drawings.

DETAILED DESCRIPTION

The present invention provides a method and apparatus for manipulation of data in multiple incongruent buffers. In the following description, numerous specific details such as particular register arrangements, data types, and signal processing algorithms are set forth in order to provide a more thorough understanding of the present invention. It will be appreciated, however, by one skilled in the art that the invention may be practiced without such details. In other instances, hardware specifics and actual code sequences have not been shown in order not to obscure the invention. Those of ordinary skill in the art, with the included descriptions, will be able to implement the necessary functionality without undue experimentation.

The improved technique for the manipulation of data in incongruent buffers utilizes a maximum concurrent run length (MCRL) counter which indicates a remaining number of filter computations until at least one of a plurality of buffers will reach its end and therefore require a pointer to be reset. The calculated and iteratively adjusted MCRL allows an inner computation loop performing the filter computations to only to perform a single test to prevent buffer exhaustion. As will be more fully discussed below, this technique provides efficient memory utilization and low computational overhead. As a result, burdensome parallel digital signal processing tasks may be more efficiently handled.

Figure 2:
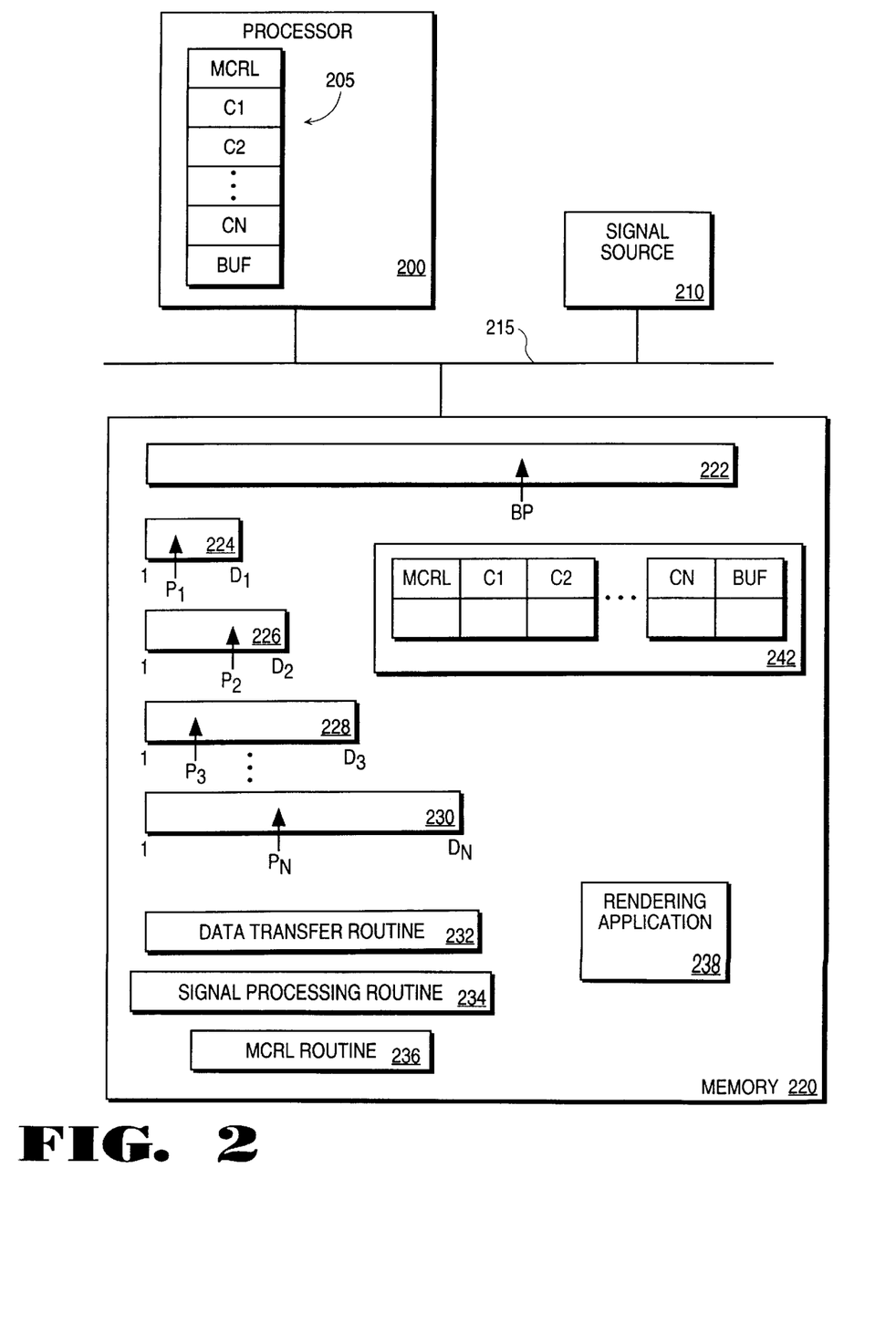
FIG. 2 illustrates an embodiment of a data processing system of the present invention which can be used to implement the digital filter illustrated in FIG. 1.

One embodiment of a system which performs signal processing in accordance with the present invention is shown in FIG. 2. A processor 200 having a plurality of registers 205 is coupled to a bus 215. The processor 200 can be either a general or a special purpose processor. Additionally, this processor 200 may comprise a single component or a number of components which collectively perform processing tasks for the system. While the registers 205 may be integrated with the processor 200, these registers may at times be considered a portion of the available system memory as discussed herein.

The system also includes a signal source 210 which may be an audio, video or other signal source. The signal source 210 provides digital information for processing and use in the system. Accordingly, the signal source 210 may be a memory device such as a cache memory, a part of system memory, a CD ROM, or a disk drive. The signal source 210 may also be a network or internet connection as well as any other mechanism which provides digital signals to the system.

The system also includes a system memory 220 containing programs and data used in signal processing tasks. The memory 220 may also comprise one or more levels of cache memory and disk storage, as well as traditionally used dynamic random access memory. In this embodiment, a rendering application 238 requests that signal processing tasks be performed on data from the signal source 210. One example of a rendering application is a computer program which performs three-dimensional manipulation of either audio or video data. The rendering application 238 could request any other type of filtering or similar manipulation of a digital signal.

Data representing the signal to be altered by the rendering application 238 is passed to a signal processing routine 234 by a data transfer routine 232. The data transfer routine 232 retrieves data from the signal source 210, and places the data in an input buffer 222. The data transfer routine 232 may be a part of the rendering application 238. In an embodiment where the signal source 210 is another portion of memory, the data transfer routine 232 may simply move data from one portion of memory to another.

The data stored in the input buffer 222 is processed by a MCRL routine 236 which iteratively calls the signal processing routine 234. Each iteration of the signal processing routine 234 operates on a plurality of buffers 224, 226, 228, and 230. These buffers are respectively capable of storing $D_1$, $D_2$, $D_3$, and $D_N$ data items. These buffers are considered incongruent because at least one of the buffer lengths $D_1$–$D_N$ is different than the others. The buffers are considered parallel not necessarily because of their locations in memory, but rather due to the fact that each buffer is operated upon during each iteration of the processing routine. Each buffer also has a buffer pointer ($P_1$, $P_2$, $P_3$, $P_N$) which marks a current location in the buffer. The input buffer 222 also has an input buffer pointer (BP) which marks a current location in the input buffer 222.

A table 242 in memory 220 stores information used by the MCRL routine 236, including the MCRL counter, the buffer delay counters $C_1$–$C_N$, and an input buffer counter (BUF or BUFFCOUNT). The delay counters $C_1$–$C_N$ respectively indicate a number of remaining entries in buffers 224–230 before an endpoint is 20 reached. The input buffer counter indicates the number of unprocessed data items in the input buffer 222.

As illustrated, the delay counters, the MCRL counter, and the input buffer counter are also stored in the plurality of registers 205 of the processor 200. This signifies that the values may, at any particular moment, be located in either the memory 220, the processor registers 205, or both, in order to facilitate the efficient execution of the signal processing routine 234 and the MCRL routine 236. In other embodiments, these values may be stored in other memory structures such as registers on or off the processor 200, cache memories on or off the processor 200, or other high performance memory structures.

Figure 3:
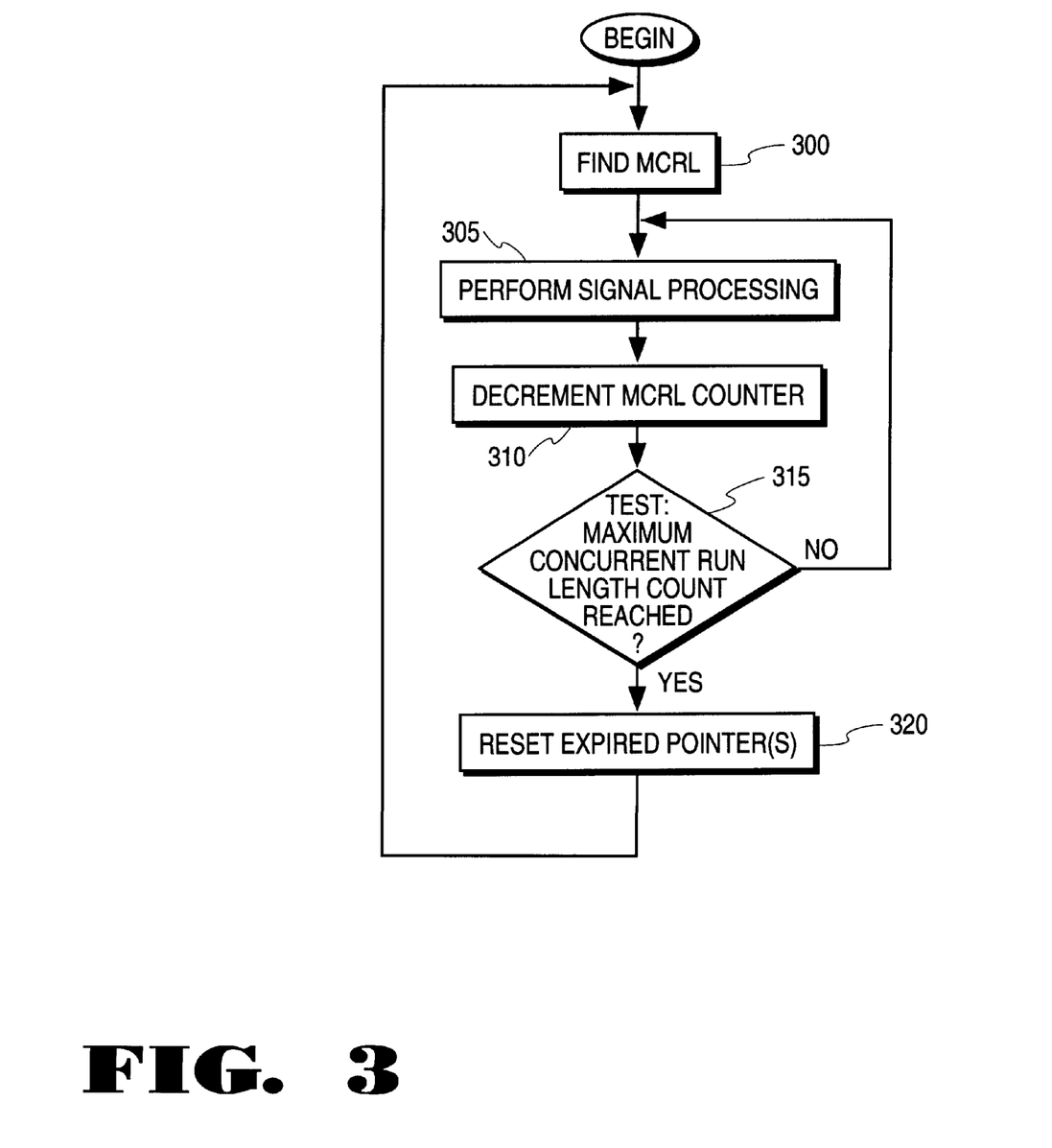
FIG. 3 illustrates a flow diagram of one embodiment of a technique for signal processing of the present invention.

The operation of one embodiment of the system illustrated in FIG. 2 is shown in flowchart form in FIG. 3. After the rendering application 238 transfers data to the input buffer 222 using the data transfer routine 232, the MCRL is calculated in step 300. To reiterate, the maximum concurrent run length counter indicates the maximum number of iterations of the signal processing routine 234 which can be performed before one of the buffers becomes exhausted. Accordingly, the MCRL routine 236 is cognizant of how the signal processing routine 234 steps through each of the buffers.

Typically, each pointer ($P_1$–$P_N$) is adjusted up or down one in each iteration of the signal processing routine 234; however, if the transfer function of each parallel branch of the filter (see FIG. 1) is a more complicated expression, several buffer locations may be consumed in each iteration of the signal processing routine. That is, if several delayed values of a transfer function are used in computing the next value, sufficient storage must be provided to maintain those several delayed values.

Additionally, the MCRL routine 236 must know the size of each buffer. Knowing both the size of the buffer and the advancement of the buffer pointer, the run length can be determined for each buffer. Once these run lengths are determined, the smallest value is stored as the MCRL counter. The MCRL routine 236 then sets a counter to the MCRL counter value or resets the counter for incrementing or decrementing until the MCRL count is reached.

In step 305 the signal processing is performed by the signal processing routine 234. This processing forms a part of an inner processing or computation loop which should be optimized as much as possible since it is regularly repeated. In this loop, any number of parallel computations can be performed according to any filter having parallel filtering functions similar to the filter illustrated in FIG. 1. The complexity of each transfer function for each parallel branch may vary as may the number of parallel branches.

In step 310 the MCRL counter is decremented. As previously mentioned, alternate embodiments may employ a different counting mechanism. For example, a counter which is incremented or a timer which expires upon reaching the MCRL count may be used. Another embodiment tracks the pointer for one of the buffers 224–230 until the pointer reaches a value calculated using the MCRL count. In general, a counter or pointer value is adjusted in step 310, the adjustment dictating the nature of the testing which will be performed in step 315.

In step 315 a test is performed to determine if the maximum concurrent run length count has been reached. When an MCRL counter is decremented in each iteration of the loop, this testing involves checking whether the MCRL counter has reached zero. Other embodiments may check for other values such as a computed pointer value; however, only one comparison is necessary because only one MCRL count is used.

If the maximum concurrent run length count has been reached, the MCRL routine 236 proceeds to reset expired pointers in step 320. Expired pointers, those at the endpoint of their respective buffers, need to be reset to the beginning of the buffer to avoid buffer over-run. Due to the incongruence of the buffers, simultaneous expiration of all buffers will be infrequent; however, multiple expirations are likely when the buffer lengths have a common denominator. Thus, the routine may need to check all the pointers as it is possible that more than one buffer pointer has reached the end of its respective buffer. After any expired pointers are reset in step 320, the MCRL routine 236 returns to the step of calculating the MCRL counter in step 300.

When the testing in step 315 indicates that the MCRL has not been reached, the MCRL routine 236 returns to the signal processing function performed in step 305. The signal processing routine 234 then processes data in subsequent positions in the buffers 224–230 now pointed to by pointers $P_1$–$P_N$. This inner computation loop provides efficient parallel execution of the transfer functions of the filter because only one counter must be adjusted and only one test must be performed in each iteration of the loop. Of course, in processing environments where auto-incrementing or auto-decrementing addressing modes are not available to adjust the pointers, additional steps may be necessary within the inner loop.

Figure 4A:
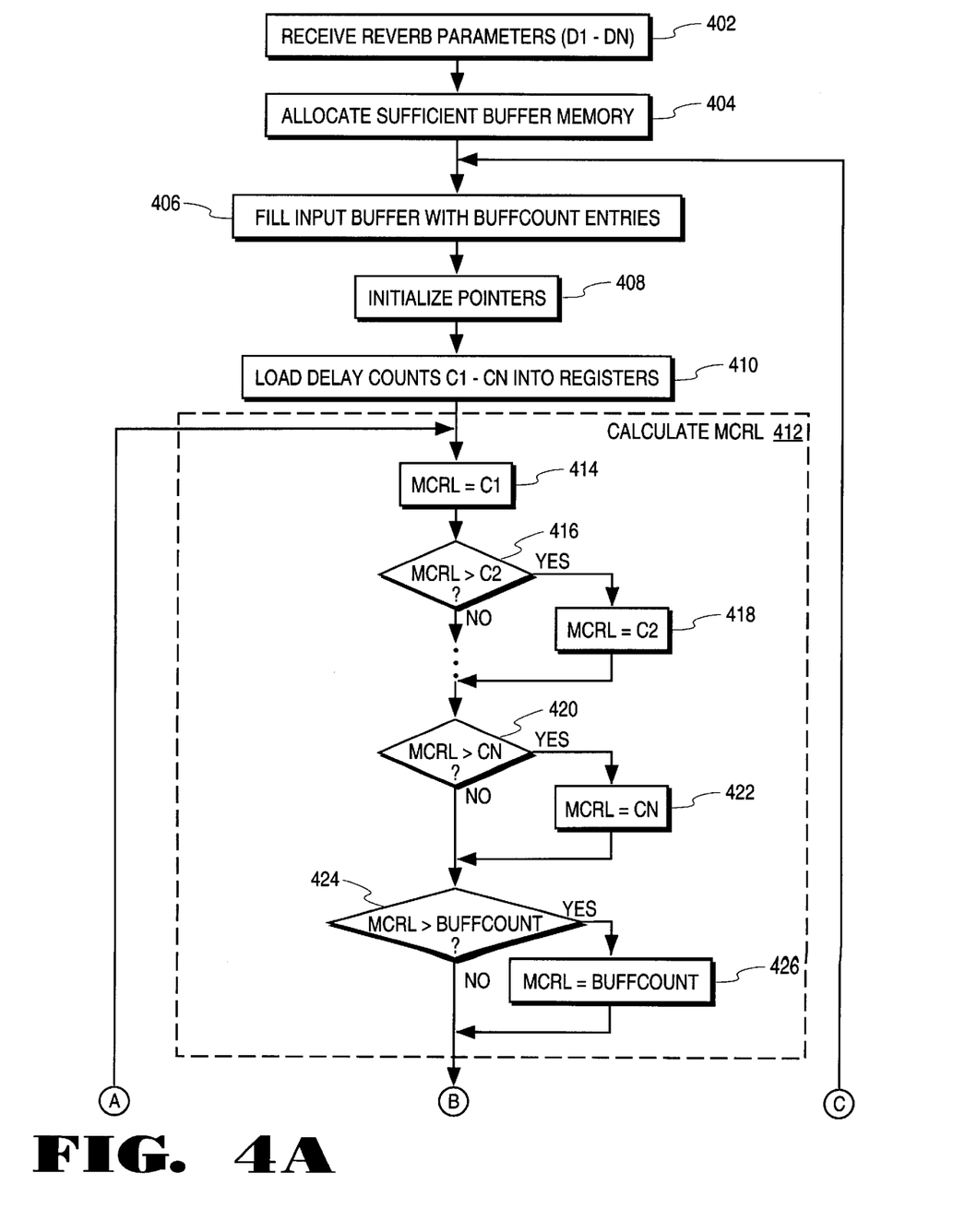
FIGS. 4A and 4B illustrate a more detailed flow diagram of another embodiment of a method of data manipulation according to the present invention.
Figure 4B:
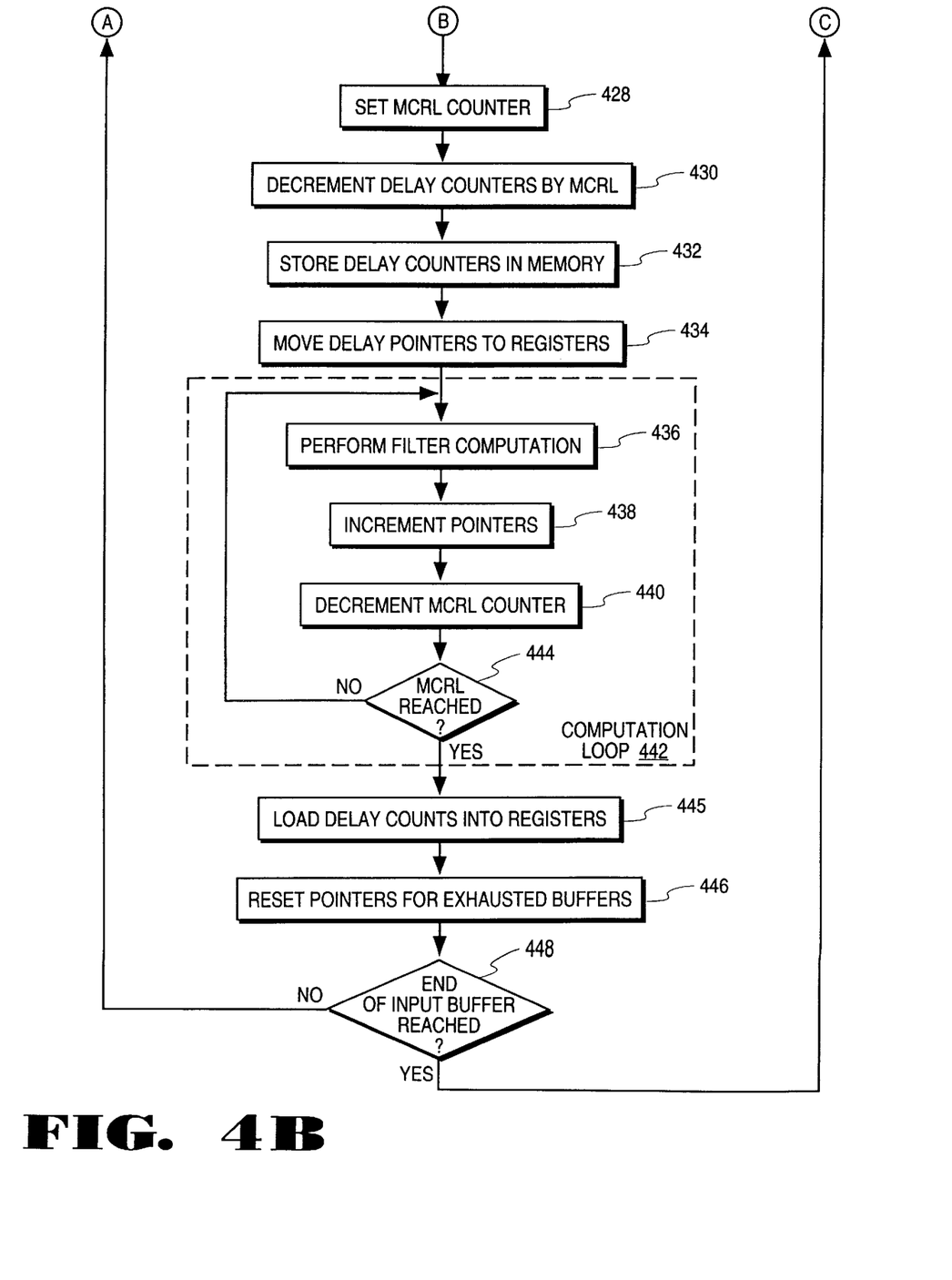

FIGS. 4A and 4B illustrate details of an embodiment which achieves inner computation loop efficiency by utilizing registers such as the plurality of registers 205 in the processor 200. This embodiment also contains details specific to implementing a reverb effect for an audio signal in a computer system. In this embodiment, the rendering application 238 can present a multimedia virtual world in which three-dimensional relative position is simulated in part by adjusting reverberation characteristics to model the movement of physical objects which cause sound wave reflections.

In step 402, the reverb filter parameters are received. These reverb parameters are delay coefficients ($D_1$–$D_N$) which dictate the length of the blocks of memory to be set aside to perform appropriate filtering. In step 404, this buffer memory sufficient for filtering is allocated. In an embodiment using the system of FIG. 2, this step is accomplished by allocating the buffers 224–230 of the appropriate length $D_1$–$D_N$. Additionally, at this point, the input buffer 222 may be allocated.

In step 406, the input buffer is filled with data. A counter, BUFFCOUNT, indicates the number of entries in the input buffer. In step 408, the pointers $P_1$–$P_N$ and BP are initialized. In the first pass, these pointers are typically initialized to the beginnings of their respective buffers. As iterations progress, the pointers are advanced in each respective buffer until the end of the buffer is reached. When the end of a buffer is reached, that buffer is said to be exhausted, and the buffer pointer must be reset to the beginning of the buffer. Thus, at initialization all pointers are typically simultaneously set to the start of their respective buffers, but later the buffer pointers may be misaligned as shown in FIG. 2.

In step 410, the delay coefficients ($D_1$–$D_N$) received as reverb parameters, are loaded into registers in the processor 200. In the first iteration, the delay coefficients are thus used to set values of the delay counters $C_1$–$C_N$. Next, the MCRL is calculated as indicated by the process 412. In step 414, the MCRL is set to $C_1$, meaning that the maximum concurrent run length is, in the first iteration, started at the full length of the first buffer 224. In step 416, the current MCRL is compared to C2, the second delay counter. If the MCRL is larger than the value of the second delay counter, this means that the second buffer 226 has a shorter remaining time before that buffer will be exhausted. Accordingly, in step 418 the MCRL is set to C2, indicating C2 as the maximum number of iterations before either one of these buffers is exhausted.

This comparison process continues for all of the buffers until the last buffer, buffer 230, is reached. In step 420, the MCRL is compared to the count for the last buffer. Again, if the MCRL is greater than that delay count, the MCRL is set to that delay count in step 422. When step 424 is reached, the MCRL reflects the largest number of iterations that all of the buffers can support before any of the buffers reach its endpoint. In the first iteration of this process, the MCRL reflects the value of the smallest buffer length. In subsequent iterations, buffer pointers start at different points in the respective buffers, and the MCRL varies accordingly.

In the embodiment shown in FIG. 2, the input buffer 222 stores data prior to processing by the signal processing routing 234. As a consequence, it is possible that the input buffer will run out of data independently of any of the buffers 224–230. Consequently, the MCRL counter is set to BUFFCOUNT (the remaining number of entries in the input buffer 222) in step 426 if a test performed in step 424 indicates that the MCRL is greater than BUFFCOUNT. After step 424, and if necessary step 426, the MCRL has been calculated. This value now indicates how many iterations of parallel filtering functions can be performed before any pointers have to be reset or any new data has to be brought into the input buffer 222.

In step 428 the calculated MCRL value is put into one of the registers 205 as an MCRL counter. The delay counters $C_1$–$C_N$, which are still stored in the registers 205, are decremented by the MCRL value in step 430. These subtractions are performed because each individual delay counter is purposely not decremented during a computation loop 442 in order to optimize that computation loop. Notably, this step could be performed at any time prior to the next MCRL calculation. Where register space is limited, the delay counters are stored in memory in step 432. This allows the delay buffer pointers ($P_1$–$P_N$) to be moved into the registers in step 434. Moving the delay buffer pointers to the registers 205 where register space is limited also has the advantage of allowing an auto-incrementing or auto-decrementing addressing mode to be used in the inner computation loop 442.

In this embodiment, the inner computation loop 442 involves, in step 436, performing the filter computation. For the reverb effect, four scaling and adding computations are performed. Step 438 can be automatically performed where an appropriate addressing mode is available. Otherwise, the delay buffer pointers are advanced to the next data item. In step 440, the MCRL counter is decremented. An iteration of the computation loop 442 is then completed in step 444 where the MCRL counter is tested to determine whether the MCRL has been reached. If the MCRL has not been reached, the computation loop is repeated until the maximum concurrent run length is reached.

At step 445, a pointer for at least one of the buffers 224–230 or the input buffer 222 indicates the end of the buffer. Since more than one buffer may have expired, it is necessary to test all the buffers to determine which pointers need to be reset. This is accomplished in one embodiment by testing whether the delay counters $C_1$–$C_N$ have reached zero and whether BP has reached the end of the input buffer 222. In an alternate embodiment, the procedure of calculating the MCRL also sets bits to indicate which buffer or buffers will expire first. In either case, the step 446 resets each exhausted buffer's pointer to the beginning of the buffer. In step 448, if the input buffer end has been reached as indicated by BUFFCOUNT being zero, it is necessary to return to step 406 to refill the input buffer. If the input buffer is not empty, the method returns to calculating the MCRL at step 414.

In an alternate embodiment, the use of counters in addition to pointers can be avoided. The MCRL is still computed in this embodiment, but its value is used to compute a reset pointer value rather than being a counter. To calculate this reset pointer, the MCRL is added to a pointer for one of the buffers. The same buffer pointer may be used to calculate each reset pointer, or the buffer which has the least remaining entries may be used. In either case, the reset pointer indicates the pointer value which will occur when this buffer reaches its endpoint. The signal processing routine, as previously, repeats until the MCRL value is reached; however, the step of testing (e.g. step 315 or 444) involves a pointer comparison to determine whether the MCRL has been reached.

Thus, the method and apparatus of the present invention provides for the manipulation of data in multiple incongruent buffers. This technique is applicable to a wide variety of filters which may be used in any digital signal processing context. One embodiment achieves computational efficiency by utilizing high performance registers and only performing one test in an inner computation loop. Additionally, available memory is conserved by limiting buffers to the lengths necessary for a particular filter and taking advantage of registers where available.

One of ordinary skill in the art will recognize that these steps may be carried out in a different order to achieve the same result. Furthermore, while certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method of processing data using a plurality of incongruent buffers, comprising:

calculating a maximum concurrent run length indicating a maximum number of buffer entries which can be processed in each of the plurality of buffers prior to reaching an method of processing data using s plurality of incongruent an endpoint of any of the plurality of buffers;

performing a filter computation for each of said plurality of buffers; and repeating the processing until the maximum concurrent run length is reached.

2. The method of claim 1 wherein the step of calculating further comprises the step of:

determining which of the plurality of buffers has a least number of remaining buffer entries before reaching a buffer endpoint.

3. The method of claim 1 wherein the step of calculating further comprises the step of:

determining which of the plurality of buffers has a lowest remaining time before buffer exhaustion.

4. The method of claim 2 wherein the step of determining further comprises:

setting the maximum concurrent run length to a first number of remaining buffer entries for one of the plurality of buffers;

setting the maximum concurrent run length to a second number of remaining buffer entries for another of the plurality of buffers if the second number is less than the first number.

5. The method of claim 4 wherein the step of determining further comprises the step of:

setting the maximum concurrent run length to a third number of remaining input buffer data items if the third number is less than the lesser of the first number and the second number.

6. The method of claim 1 wherein the step of repeating further comprises the steps of:

adjusting a counter value;

testing whether the counter value indicates that the maximum concurrent run length has been reached; and returning to the step of processing.

7. The method of claim 1 further comprising the step of:

returning to the step of calculating if an input buffer contains additional data.

8. The method of claim 1 further comprising, before the step of calculating, the steps of:

receiving a plurality of reverb filter delay coefficients;

allocating a plurality of memory blocks for the plurality of buffers, each of the plurality of memory blocks having a length determined by one of the plurality of reverb filter delay coefficients; and setting a plurality of delay counters to each of the plurality of reverb filter delay coefficients.

9. The method of claim 8 wherein the step of calculating further comprises the steps of:

determining the least of the plurality of delay counters.

10. The method of claim 1 wherein the step of repeating further comprises the steps of:

computing a reset pointer using the maximum concurrent run length and a buffer pointer for one of the plurality of incongruent buffers; and testing whether the buffer pointer has reached the reset pointer.

11. The method of claim 6 wherein the step of repeating further comprises the step of:

returning to the step of processing if the buffer pointer has not reached the reset pointer.

12. A method of processing data using a plurality of incongruent buffers, comprising:

initializing a plurality of buffer pointers for a plurality of incongruent buffers and a plurality of delay counts;

testing which of the plurality of delay counts is a smallest delay count;

setting a maximum concurrent run length to the one of the plurality of delay counts which is the smallest delay count;

repeating, until the maximum concurrent run length is reached:

performing a filter computation storing values in and utilizing values from the plurality of incongruent buffers;

adjusting the plurality of buffer pointers; and returning to the step of determining when the maximum concurrent run length is reached.

13. The method of step 12 wherein the step of repeating further includes the step of:

decrementing a maximum concurrent run length counter.

14. The method of claim 12 further comprising, after the step of testing and before the step of returning, the step of:

adjusting the plurality of delay counts by the maximum concurrent run length.

15. The method of claim 14 wherein the step of initializing further comprises the steps of:

receiving a plurality of delay coefficients;

loading a plurality of registers for tracking the plurality of delay counts with the plurality of delay coefficients; and setting the plurality of buffer pointers to point to the plurality of incongruent buffers.

16. The method of claim 15 wherein the step of adjusting occurs prior to the step of repeating, and wherein the method further comprises, after the step of adjusting, the steps of:

storing the plurality of delay counts in memory; and moving the plurality of buffer pointers into the plurality of registers.

17. The method of claim 16 further comprising, before the step of returning, the step of:

loading the plurality of registers with the plurality of delay counts.

18. The method of claim 12 further comprising, before the step of adjusting, the step of:

setting the maximum concurrent run length counter to a remaining number of input buffer entries in an input buffer if the remaining number of input buffer entries is less than the smallest delay count.

19. The method of claim 18, prior to the step of returning, further comprising the steps of:

testing whether an input buffer pointer has reached an end of the input buffer; and reloading the input buffer if the end of the input buffer has been reached.

20. A system comprising:

a processor;

a memory coupled to the processor and containing therein:

a plurality of memory blocks defining a plurality of incongruent buffers;

a plurality of buffer counters;

a maximum concurrent run length calculation routine which, when executed by the processor, determines a maximum concurrent run length count indicating a least number of iterations remaining from the plurality of buffer counters; and a data processing routine which, when executed by the processor, repetitively performs a filter computation of values in the plurality of incongruent buffers until the maximum concurrent run length count is reached.

21. The system of claim 20 wherein the memory comprises a plurality of processor registers and main memory means.

22. The system of claim 21 wherein the memory further contains a plurality of pointers, and wherein the data processing routine adjusts each of the plurality of pointers and adjusts a counter value until the counter value indicates the maximum concurrent run length count is reached.

23. The system of claim 22 wherein the data processing routine adjusts each of the plurality of pointers by incrementing the pointer, and wherein the counter value is a maximum concurrent run length counter value adjusted by the data processing routine by decrementing the maximum concurrent run length counter value.

24. The system of claim 20 wherein the memory further contains an input data count and a data transfer routine which, when executed by the processor, fills the plurality of incongruent buffers with signal data, and wherein the maximum concurrent run length calculation routine selects the least of the plurality of buffer counters and the input data count as the maximum concurrent run length count.

25. The system of claim 22 wherein the plurality of processor registers contain the plurality of pointers and the maximum concurrent run length count during a computation loop of the data processing routine.

26. A system comprising:

memory means for storing data in a plurality of incongruent buffers;

run length computation means for determining a run length count representing a smallest number of filtering iterations before exhaustion of one of the plurality of incongruent buffers; and filtering means for processing data in the plurality of incongruent buffers, the filtering means continuing processing until the run length count is reached.

27. The system of claim 26 wherein the run length computation means includes input buffer testing means for setting the run length count to a remaining input data count if the remaining input data count is less than the smallest number.

28. The system of claim 26 wherein the memory means includes a plurality of registers and the system further comprises: means for utilizing the plurality of registers for indexing during an inner computation loop performed by the filtering means.

* * * * *

UNITED STATES PATENT AND TRADEMARK OFFICE
CERTIFICATE OF CORRECTION

PATENT NO. : 6,122,444
DATED : September 19, 2000
INVENTOR(S) : Shen

It is certified that error appears in the above-identified patent and that said Letters Patent is hereby corrected as shown below:

Claim 1,
Line 42, after "reaching" delete "an method of processing data using s plurality of incongruent".

Signed and Sealed this

Fourth Day of December, 2001

Attest:

NICHOLAS P. GODICI
Attesting Officer   Acting Director of the United States Patent and Trademark Office